(12) United States Patent
Singhai et al.

(10) Patent No.: US 11,861,636 B2
(45) Date of Patent: Jan. 2, 2024

(54) PROVIDING INSIGHTS AND SUGGESTIONS FOR JOURNEYS

(71) Applicant: ADOBE INC., San Jose, CA (US)

(72) Inventors: Pankhri Singhai, Delhi (IN); Piyush Gupta, Noida (IN); Balaji Krishnamurthy, Noida (IN); Jayakumar Subramanian, Noida (IN); Nikaash Puri, New Delhi (IN)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/910,357

(22) Filed: Jun. 24, 2020

(65) Prior Publication Data
US 2021/0406935 A1 Dec. 30, 2021

(51) Int. Cl.
| | |
|---|---|
| *G06Q 30/02* | (2023.01) |
| *G06Q 30/0204* | (2023.01) |
| *G06N 20/00* | (2019.01) |
| *G06Q 30/0201* | (2023.01) |
| *G06Q 10/0633* | (2023.01) |

(52) U.S. Cl.
CPC ......... *G06Q 30/0205* (2013.01); *G06N 20/00* (2019.01); *G06Q 10/0633* (2013.01); *G06Q 30/0201* (2013.01)

(58) Field of Classification Search
CPC .......................................... G06Q 10/00–90/00
See application file for complete search history.

(56) References Cited

U.S. PATENT DOCUMENTS

| | | | |
|---|---|---|---|
| 2018/0329727 A1* | 11/2018 | Cao | G06N 7/01 |
| 2019/0005540 A1* | 1/2019 | Ganapathisubramanian | G06Q 30/0204 |
| 2019/0034963 A1* | 1/2019 | George | H04L 67/535 |
| 2020/0126126 A1* | 4/2020 | Briancon | G06N 5/01 |
| 2020/0273052 A1* | 8/2020 | Ganti | G06Q 30/0204 |

OTHER PUBLICATIONS

Nikaash Puri, MAGIX: Model Agnostic Globally Interpretable Explanations, 2017, Cornell University (Year: 2017).*
Puri, N., Gupta, P., Agarwal, P., Verma, S., & Krishnamurthy, B. (2017). Magix: Model agnostic globally interpretable explanations. arXiv preprint arXiv:1706.07160.

* cited by examiner

*Primary Examiner* — Arif Ullah
(74) *Attorney, Agent, or Firm* — SHOOK, HARDY & BACON L.L.P.

(57) ABSTRACT

Methods and systems are provided for generating and providing insights associated with a journey. In embodiments described herein, journey data associated with a journey is obtained. A journey can include journey paths indicating workflows through which audience members can traverse. The journey data can include audience member attributes (e.g., demographics) and labels indicating journey paths traversed by audience members. A set of audience segments are determined that describe a set of audience members traversing a particular journey path. The set of audience segments can be determined using the journey data to train a segmentation model and, thereafter, analyzing the segmentation model to identify patterns that indicate audience segments associated with the particular journey path. An indication of the set of audience segments that describe the set of audience members traversing the particular journey path can be provided for display.

20 Claims, 10 Drawing Sheets

| User ID | Geo-State | Gender | Journey-Path-1 | Journey-Path-2 |
|---|---|---|---|---|
| 1 | California | Male | 1 | 0 |
| 2 | Texas | Male | 1 | 0 |
| 3 | California | Female | 0 | 1 |
| 4 | California | Female | 0 | 1 |
| 5 | California | Male | 1 | 1 |
| 6 | Texas | Male | 1 | 0 |
| 7 | California | Male | 1 | 0 |
| 8 | Texas | Female | 1 | 0 |
| 9 | Texas | Female | 1 | 0 |
| 10 | Texas | Female | 1 | 0 |

FIG. 3.

PROVIDING INSIGHTS AND SUGGESTIONS FOR JOURNEYS

BACKGROUND

Users often desire to view various workflows that model different paths through which consumers may progress. As such, workflows may be created to enable a user to visualize different paths consumers may traverse. Understanding performance associated with the various workflows can enable users, such as marketers, to better tailor the workflow to the individuals progressing through the workflows. Manually analyzing data to understand workflow performance, however, can be time consuming and inaccurate. Further, as such manual analysis is often an iterative approach, the data may be stale by the time any identified modifications are made to a workflow, thereby resulting in ineffective workflow modifications.

SUMMARY

Accordingly, embodiments of the present disclosure are directed to facilitating provision of insights and/or suggestions related to a journey, or journey workflow. In particular, implementations described herein enable journey performance to be monitored (e.g., in real time) and used to identify journey insights, such as audience segments traversing journey paths of a journey. That is, for a particular journey path, audience segments that describe the population of audience members in that journey path can be identified and presented to a user (e.g., marketer). An indication of audience segments provides insight to the user such that the user can modify a workflow to be better suited to the audience members partaking in the journey. Further, suggestions can be provided to suggest or recommend journey modifications that may facilitate an enhanced journey in terms of achieving a particular objective (e.g., marketing objective). Such suggestions may be directed to a channel for use in communicating content to audience members (consumers), a time for communicating content, a type of content, a sub-segment of audience members to target, and/or the like. Advantageously, such insights and suggestions can be provided in real time such that a user can quickly improve a workflow.

BRIEF DESCRIPTION OF THE DRAWINGS

FIG. 3 illustrates an example of a data set including audience member attributes and labels that correspond with journey paths of audience members, in accordance with embodiments of the present invention.

DETAILED DESCRIPTION

Figure 1:
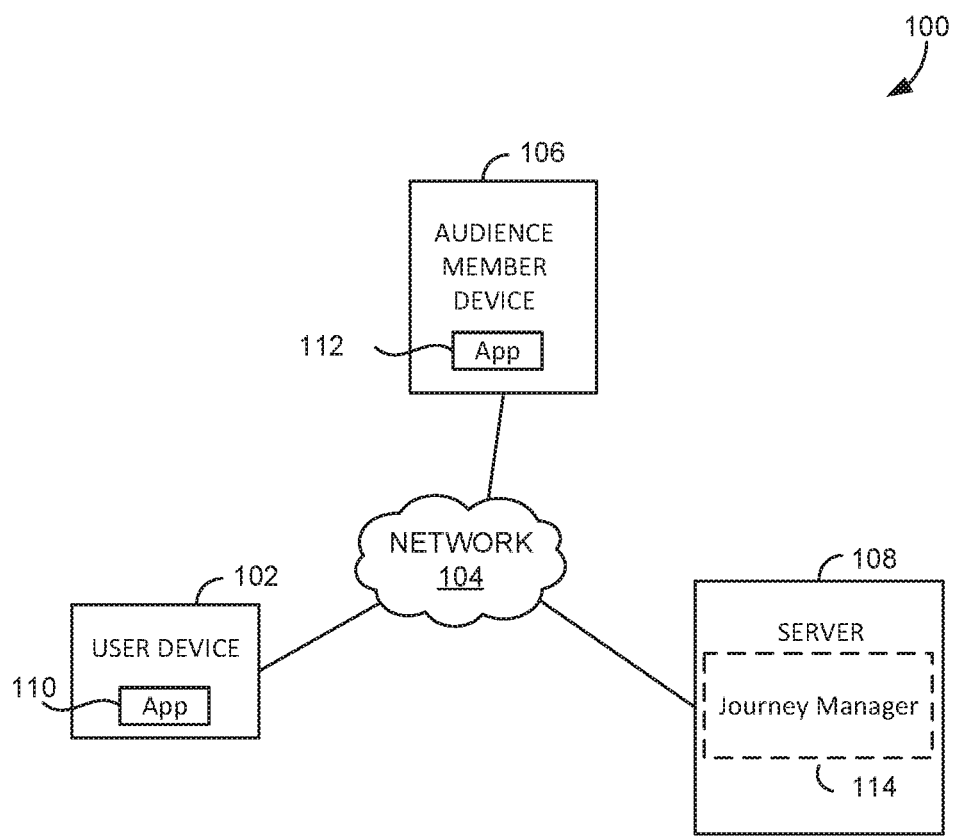
FIG. 1 depicts a diagram of an environment in which one or more embodiments of the present disclosure can be practiced, in accordance with various embodiments of the present disclosure.

Workflows can be created to model different paths consumers may progress. In addition to visualizing different paths consumers may progress, performance of consumers traversing such paths can be valuable. For example, monitoring performance of consumers' flow through a workflow can provide information that can be used to better tailor the workflow to the users.

Some conventional systems generate reports reflecting performance of consumers' flow. However, a user (e.g., marketer) typically must review and analyze the performance data in an effort to gain any insights as to performance. Such manual analysis of data can be extremely time consuming and inaccurate. For example, a user may need to analyze the data, modify the workflow, and reassess whether the modifications resulted in a positive performance impact. This manual analysis performed after each iteration of modifications to the workflow can continue until a desired result is achieved. As numerous aspects of a workflow can be adjusted, such a process can be tedious and inefficient.

As such, embodiments of the present disclosure are directed to facilitating generation of insights and/or suggestions related to a journey, or journey workflow. In particular, and at a high level, implementations described herein enable journey performance to be monitored (e.g., in real time) and used to identify journey insights, such as audience segments traversing journey paths of a journey. That is, for a particular journey path, an audience segment or set of audience segments that describe the population of audience members in that journey path can be identified and presented to a user (e.g., marketer). An indication of audience segments provides insight to the user such that the user can modify a workflow to be better suited to the audience members partaking in the journey. Further, suggestions can be provided to suggest or recommend journey modifications that may facilitate an enhanced journey in terms of achieving a particular objective (e.g., marketing objective). Such suggestions may be directed to a channel for use in communicating content to audience members (consumers), a time for communicating content, a type of content, a sub-segment of audience members to target, and/or the like. Advantageously, such insights and suggestions can be provided in real time such that a user can quickly improve a workflow.

In operation, a user, such as a marketer, may generate or create a journey workflow via a user interface. As audience members (e.g., consumers) proceed through the journey workflow, such movement can be tracked or monitored to recognize performance of the various journey paths in a journey. For example, a number or percent of audience members that traverse the various journey paths may be monitored and recorded. Such a performance indicator may also be presented in association with the journey workflow for easy visualization by a user. In some embodiments, to obtain or view journey insights associated with a particular journey workflow, a user may select a performance indicator associated with the workflow (e.g., percent of audience members that traverse the corresponding journey path).

As described herein, journey insights can be provided in the form of audience segment identification. In this regard, an identification of audience segments that proceed through a journey path can be provided to a user. To identify audience segments associated with a journey path, machine learning can be used to automatically learn patterns that distinguish audience segments across journey paths. By performing machine learning model interpretation on such a machine learned model, patterns indicating audience segments that describe audience members in journey paths can be extracted and provided to a user. As such, a user may utilize such audience segments to target the audience members in a different manner (e.g., to improve journey performance). Advantageously, such a method enables goal-driven audience segmentation. Objective driven, or goal oriented, segmentation, facilitates insights for a given objective. Stated differently, this approach derives audience segments predictive of a given class label (e.g., journey path). A goal can be used to guide the segmentation. For instance, when a marketer selects a particular path of a journey, the goal can include whether an audience member(s) entered the selected journey path. As another example, if a marketer wants to identify audience segments that generate high revenue, a goal may be whether an audience member(s) has spent more than a particular amount of money on a particular website visit. Utilizing a goal and goal-driven segmentation leads to audience segments that optimize for the goal.

In addition to providing journey insights, such as audience segments, embodiments described herein also provide interventions suggestions. An intervention suggestion generally refer to a suggestion for an intervention that can be applied to a journey to target or engage an audience segment, or portion thereof, better. For example, an intervention may be applied to target an underperforming audience segment. By way of example only, an intervention may include modifying a time at which a response is provided, a channel through which a response is provided, an audience segment to which an intervention is directed (e.g., create a new journey path or segment for a subgroup of an audience segment), content associated with a response, or the like. To generate intervention suggestions, an audience member model can be generated and used to predict a likelihood of an audience member responding to an intervention. Such likelihoods can then be used to select an intervention(s) to provide as a suggestion and/or apply to a journey.

Various terms are used throughout the description of embodiments provided herein. A brief overview of such terms and phrases is provided here for ease of understanding, but more details of these terms and phrases is provided throughout.

A journey generally refers to a workflow, for example, related to marketing. A journey may have various journey paths that make up the journey. That is, a journey may have different workflow portions or paths that may be traversed by audience members. As such, a journey path can be a portion of a journey. In one instance, an audience member generally flows through only one journey path. A journey path may include any number of segments or portions that make up a journey path. For example, a journey path may comprise a single journey segment or multiple connected, or consecutive, journey segments (portions). Generally, at a condition in a journey, multiple journey segments extend as branches.

A journey may include a set of one or more events, controls, and/or corresponding responses. An event refers to an event or action that is performed by a user. A control generally refers to some control or management of a response based on an event (e.g., timing of response, condition for a response, etc.). A response refers to any response or action provided in response to the event performed by the user.

An intervention generally refers to an action to take to target or engage an audience segment, or portion thereof, better. For example, an intervention may be applied to target an underperforming audience segment. An intervention may be applied to an event, a condition, and/or a response associated with a journey.

An audience member generally refers to an individual, such as a consumer, that is being monitored in association with a journey workflow. Audience members do not need to be pre-identified, that is, an individual may become an audience member by virtual of performing an initial event of a journey.

An audience segment refers to a data segment or group (set of audience members) that have a common attribute or feature. Such common attributes may be demographic attributes, interest attributes, preference attributes, behavior attributes, and/or the like.

A user refers to an individual or entity that may view or access journey insights and/or suggestions. In some cases, a user may generate or create a journey being monitored, but that need not be the case. Although a user is generally referred to herein as a marketer, that is for provided for exemplary purposes only.

Turning to FIG. 1, FIG. 1 depicts an example configuration of an operating environment in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 10.

It should be understood that operating environment 100 shown in FIG. 1 is an example of one suitable operating environment. Among other components not shown, operating environment 100 includes a number of user devices, such as user devices 102a and 102b through 102n, network 104, audience member devices 106a and 106b through 106n, and server(s) 108. Each of the components shown in FIG. 1 may be implemented via any type of computing device, such as one or more of computing device 1000 described in connection to FIG. 10, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within operating environment 100 within the scope of the present disclosure. Each may comprise a single device or multiple devices cooperating in a distributed environment.

User devices 102a through 102n and audience member devices 106a through 106n can be any type of computing device capable of being operated by a user. For example, in some implementations, such devices are the type of computing device described in relation to FIG. 10. By way of example and not limitation, user devices and audience member devices may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices and audience member devices can include one or more processors, and one or more computer-readable media. The computer-readable media may include computer-readable instructions executable by the one or more processors. The instructions may be embodied by one or more applications, such as application 110 and 112 shown in FIG. 1. Applications 110 and 112 are referred to as single applications for simplicity, but its functionality can be embodied by one or more applications in practice. As indicated above, the other user and audience member devices can include one or more applications similar to applications 110 and 112.

Application 112 operating on audience member device 106 may be any application with which a user interacts. In embodiments, audience member interactions with application 112 may be monitored (e.g., via a server) to identify progress of an audience member in association with a journey(s).

Application 110 operating on user device 102 may generally be any application capable of facilitating the exchange of information between the user devices and the server(s) 108 in carrying out identifying or providing journey insights and/or suggestions. In some implementations, the application(s) comprises a web application, which can run in a web browser, and could be hosted at least partially on the server-side of environment 100. In addition, or instead, the application(s) can comprise a dedicated application, such as an application having image processing functionality. In some cases, the application is integrated into the operating system (e.g., as a service). It is therefore contemplated herein that "application" be interpreted broadly.

In accordance with embodiments herein, the application 110 can facilitate identifying and/or presenting journey insights and/or suggestions. In operation, a user can develop a journey flow via a graphical user interface provided via the application 110. Based on interactions of audience members (e.g., via audience member devices), the journey manager 114 can identify journey insights and/or suggestions and provide such information to application 110 of the user device. The journey insights and/or suggestions can be displayed via a display screen of the user device. The journey insights and/or suggestions can be presented in any manner.

As described herein, server 108 can facilitate identifying and/or providing journey insights and suggestions via journey manager 114. Server 108 includes one or more processors, and one or more computer-readable media. The computer-readable media includes computer-readable instructions executable by the one or more processors. The instructions may optionally implement one or more components of journey manager 114, described in additional detail below with respect journey manager 202 of FIG. 2. At a high level, journey manager 114 generates journey insights and/or suggestions for providing to a user in relation to a journey. In particular, the journey insights can indicate audience segments associated with a particular journey path(s). Based on the identified audience segments for a journey path, an intervention suggestion can be determined and provided such that the journey may be modified to increasingly facilitate the journey objective.

For cloud-based implementations, the instructions on server 108 may implement one or more components of journey manager 114, and application 110 may be utilized by a user to interface with the functionality implemented on server(s) 108. In some cases, application 110 comprises a web browser. In other cases, server 108 may not be required. For example, the components of journey manager 114 may be implemented completely on a user device, such as user device 102a. In this case, journey manager 114 may be embodied at least partially by the instructions corresponding to application 110.

Thus, it should be appreciated that journey manager 114 may be provided via multiple devices arranged in a distributed environment that collectively provide the functionality described herein. Additionally, other components not shown may also be included within the distributed environment. In addition, or instead, journey manager 114 can be integrated, at least partially, into a user device, such as user device 102a, and/or audience member device, such as audience member device 106a. Furthermore, journey manager 114 may at least partially be embodied as a cloud computing service.

Figure 2:
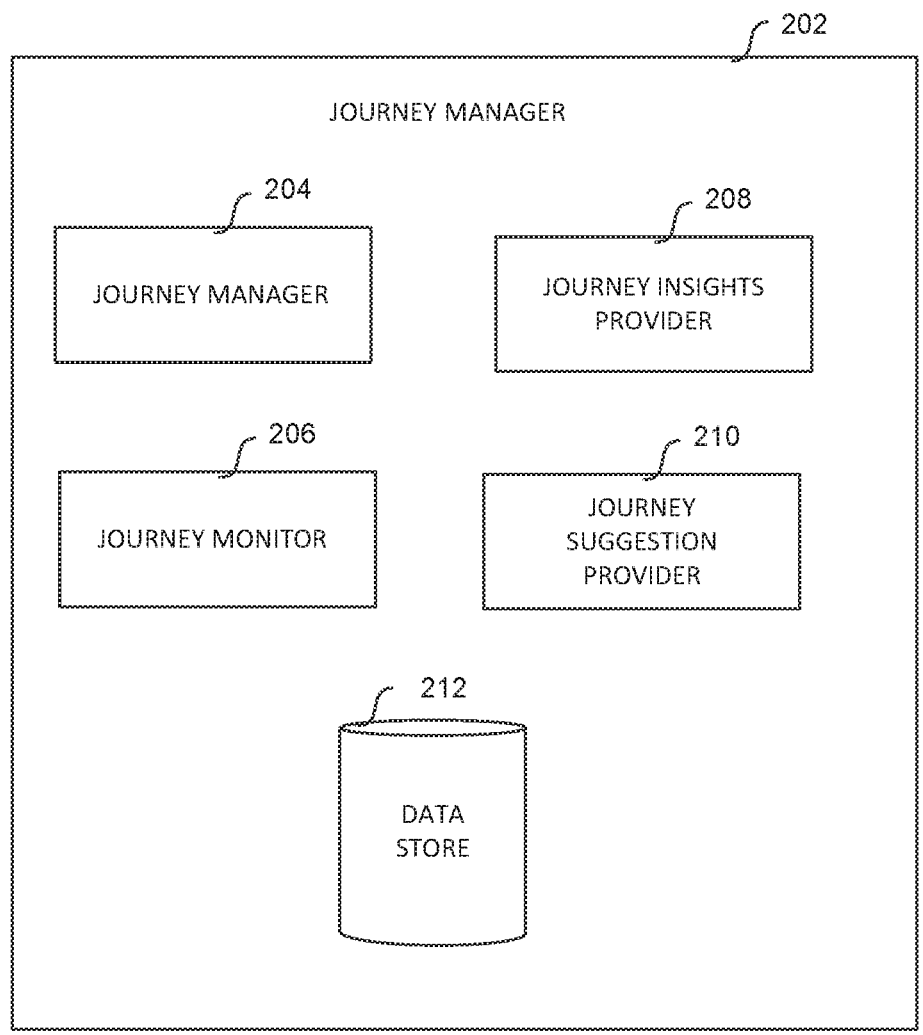
FIG. 2 depicts an example configuration of an operating environment in which some implementations of the present disclosure can be employed, in accordance with various embodiments of the present disclosure.

Referring to FIG. 2, aspects of an illustrative journey management system are shown, in accordance with various embodiments of the present disclosure. At a high level, a journey manager can manage journeys, including development, monitoring, and reporting associated with journeys. In this regard, the journey manager can determine and provide (e.g., in real time) insights and suggestions associated with journeys. As described herein, a journey refers to a workflow, for example, related to marketing. A journey may include a set of one or more events, controls, and/or corresponding responses. To this end, a journey may include a sequence of events, controls, and/or responses through which audience members (e.g., individuals, customers) may traverse. An event refers to an event or action that is performed by a user. Generally, an event may be an action performed or detected via a computer (i.e., computer-based events). Examples of computer-based events include selecting or clicking on a particular product, electronically purchasing a particular product, navigating to a particular website, entering and/or existing a retail brick-and-mortar store, and the like. A control generally refers to some control or management of a response based on an event (e.g., timing of response, condition for a response, etc.). A response refers to any response or action provided in response to the event performed by the user. A response may be, for example, an electronic communication providing information related to the event in which the user participated. For example, an electronic communication may be related to a product associated with an event. Although events and responses are generally described herein as being electronically performed or detected, embodiments described herein are not intended to be limited hereto. For instance, a communication may be sent via the mail to provide a response in association with an event performed by a user, or an action taken by a user.

As shown in FIG. 2, journey manager 202 can include a journey developer 204, a journey monitor 206, a journey insights provider 208, a journey suggestion provider 210, and a data store 212. The foregoing components of journey manager 202 can be implemented, for example, in operating environment 100 of FIG. 1. In particular, those components may be integrated into any suitable combination of user devices 102a and 102b through 102n, audience member devices 106a and 106b through 106n, and/or server(s) 108.

Data store 212 can store computer instructions (e.g., software program instructions, routines, or services), data, and/or models used in embodiments described herein. In some implementations, data store 212 stores information or data received or generated via the various components of journey manager 202 and provides the various components with access to that information or data, as needed. Although depicted as a single component, data store 212 may be embodied as one or more data stores. Further, the information in data store 212 may be distributed in any suitable manner across one or more data stores for storage (which may be hosted externally).

In embodiments, data stored in data store 212 includes journey data, audience member data, insight data, and/or suggestion data. Journey data generally refers to data associated with a journey. As such, journey data can include data pertaining to or related to a journey(s). As such, journey data may indicate various events, controls, responses, or data identified in association with implementation of a journey. Journey data may also include interaction data indicating interactions with websites, applications, etc. In this regard, as data is accumulated in relation to audience member progress through a journey, the data can be stored in data store 212. Audience member data refers to any data associated with an audience member. As such, audience member data may include audience member attributes, audience member interactions (e.g., website clicks, purchases, engagement with responses, etc.). Audience member data may be stored in association with an audience member profile via data store 212. Insight data generally refers to any data determined or obtained as insight data related to a journey. Insight data may include indications of audience segments associated with journey paths. Suggestion data generally refers to any data that can be provided as a suggestion for facilitating journey enhancement or improvement. In embodiments, suggestion data includes suggested interventions designed to enable more audience member engagement with responses. In some cases, journey manager 202, or components associated therewith can obtain data from client devices (e.g., a marketer device(s), audience member device(s), etc.). In other cases, data can be received from one or more data stores in the cloud.

The journey developer 204 can be used to develop or generate a journey. As used herein, a journey generally refers to a workflow and may include a set of one or more events, controls, and/or corresponding responses. By way of example only, journey workflows may be related to onboarding experience for new users, responding to abandoned actions, and delivering real-time location based experiences. In embodiments, journeys may be related to a marketing workflow associated with a campaign. In this regard, a journey is developed or created in an effort to achieve a particular marketing goal. A marketing goal may be any goal related to marketing and is not intended to be limited herein. By way of example only, a marketing goal may be a financial goal (e.g., maximize spend), a consumer interaction goal (e.g., click-through rate, conversion rate), or the like.

To generate a journey, a user, such as a marketer, may select or input events, controls, and/or responses. The events, controls, and/or responses may be presented via a graphical user interface in a workflow diagram to illustrate one or more workflow paths. Generally, the journey manager 202 enables a user (e.g., a marketer) to use events, controls (e.g., end, condition, timer), and/or responses (e.g., email, SMS) to design workflows for personalized engagements with audience members (e.g., customers).

Journey developer 204 may be used to create a journey based on placement or positioning of various events, controls, and/or responses within a user interface. In embodiments, a journey may begin with an initial event. For example, an initial event might represent a mobile application consumer entering a geofence around a store or set of stores. As another example, an initial event may represent a web consumer adding an item to an online shopping cart but not completing the purchase (e.g., identification of an abandoned shopping cart). In addition to an event being an initial starting point of a journey, events may also serve as a way point within a journey.

To position or place events within a journey, in one embodiment, events can be selected from a menu or panel and placed into the workflow interface (e.g., drag and drop). This is only one example of selecting or inputting events, and such event selection or input may occur in any number of ways and is not intended to be limited hereto. A set of events available for placement into a journey workflow may be default events or user-generated events. A default event may include an event automatically generated and presented for user selection. As such, default events may be presented as event options across users (e.g., marketers). A user-generated event may be an event generated specifically for a user or a particular campaign. In this regard, a mobile application, website, or back-end system may be configured to create and send events to the journey manager 202 such that a user may select and utilize the event in a journey workflow.

In some cases, event details may be added or modified by a user. For example, an event may represent a mobile application consumer entering a geofence around a store or set of stores. In such a case, a user may add details specifying a specific store, or a geofence size, if not specifically designated by the event.

Controls enable a user to control the flow of the experience that follows from an event, such as an initial event. A control may include, for example, a condition or a timer. A condition enables different journey paths to be taken dependent on the condition. As such, a condition enables a user to tailor the experience to a particular audience member, for example, based on an audience member profile (e.g., a type of audience member, demographic related to audience member, audience member preference, etc.), context data from the event itself, or journey data from other external sources (e.g., accessible in real time), such as audience member interactions. As can be appreciated, application of conditions may result in different responses and/or events within a journey. For example, a condition may split the journey to send individuals into different journey paths. A timer refers to a timer that can be used to control the timing in sequencing of events and/or responses. As such, a timer may allow for different timing for engaging with individuals.

Controls (e.g., conditions or timer) may be selected or input by a user in any number of ways. By way of example only, a control may be selected (e.g., via a menu or panel) and positioned via the graphical user interface. In some cases, control details may be specified by a user. For example, a condition may be added in association with an event to generate different journey paths extending from the event. In such a case, a user may specify the various attributes associated with the condition or the different journey paths. For example, a user may specify one journey path corresponds with users associated with a first attribute (e.g., first age range), a second journey path corresponds with users associated with a second attribute (e.g., second age range), and a third journey path corresponds with users associated with a third attribute (e.g., third age range).

Responses within a journey workflow enable engagement with audience members. In embodiments, a response includes message or content delivery, but may additionally or alternatively include other methods of engagement with an audience member(s). Responses may be provided to audience members, for example, in the form of push notification, emails, or text messages. As can be appreciated, responses may be generated and/or communicated through the journey manager 202 or other component. For example, a marketing campaign service (e.g., Adobe® Campaign) or other accessible service (e.g., via an API) can provide a response associated with a journey to provide real-time, one-to-one experiences for different audience members.

Responses within a journey may be input or selected in any number of ways. By way of example only, a response may be selected (e.g., via a menu or panel) and positioned via the graphical user interface. In some cases, response details may be specified by a user. For example, a response may be added in association with an event and/or control (e.g., condition). In such a case, a user may specify the various attributes associated with the response. For example, a user may indicate content to include with a response, channel in which to use to deliver content, a time indicator for delivery content. Content may be any content and is not intended to be limited herein. Examples of content may include discounts, target items, promotions, information, and/or the like. A channel may be, for example, an email, a SMS message, a text message, or other methods that can be used for providing information. A time indicator may refer to any indication associated with time, including days, months, years, hours, minutes, etc. A time indicator may include a range of days/times or specific days/times.

In accordance with developing a journey, the journey monitor 206 may monitor audience member movement along a journey, or portion thereof (e.g., journey path). As such, the journey monitor 206 may monitor progress through a journey, or journey paths. To monitor progress, the journey monitor 206 may monitor various audience member interactions to identify occurrences of events. To monitor audience member interactions, the journey monitor 206 may access audience member (e.g., customer) data in real time (e.g., from the data store 212 and other external data sources) and analyze such data to identify whether an audience member has performed an event. Further, audience member interactions may be tracked or monitored to identify paths taken by audience members. By monitoring audience member interactions, the journey monitor 206 can listen for events, track events, and track paths taken by audience members.

As the journey monitor 206 detects progress through a journey, the journey monitor 206 (or other component) may initiate responses as needed. For example, assume an audience member has performed an event and satisfied a particular condition associated therewith. In such a case, a particular response, such as a push notification, that corresponds with the event and satisfaction of the particular condition may be initiated or triggered. In such a case, the journey monitor 206 may initiate an appropriate response in an effort to engage a user. As described, responses may be communicated via another component or system in communication with the journey manager 202.

In accordance with detecting journey progress, the journey monitor 206 can record and/or report on such progress. For example, audience member progress can be captured in data store 212 as journey data (and/or audience member data). Examples of journey data that may be tracked include data related to journey start (i.e., total number of individuals who reached the entry event of the journey); journey completion or journey completion rate (total number of individuals who reached the end of the journey (or in case of an individual not matching any condition) compared to the total number of individuals who entered the journey); journey current (total number of individuals currently in the journey); journey fail rate (total number of journeys that were not successfully executed compared to the number of run journeys); responses sent (total number of messages sent); response delivery rate (total number of messages successfully delivered compared to messages sent); response delivery bounce rate (total number of messages that bounced compared to messages sent); response delivery unsubscribe rate (total number of unsubscriptions by recipient compared to the delivered messages); response delivery open rate (total number of opened messages compared to the number of delivered messages); response delivery click rate (total number of clicks in a delivery compared to the number of delivered messages); journey path value (value, such as number, count, or percentage, related to how many audience members have traversed a particular journey path or segment); and the like.

The journey monitor 206 may provide journey data in association with the journey workflow visualization. For example, a journey path value may be presented (e.g., overlayed) in relation to the corresponding journey path in the workflow visualization. To this end, a percent of audience members that traverse each path or segment of a journey may be presented to indicate a proportion of audience members that traverse each particular path. Such presented data can include live reporting so that a user has a real-time accurate understanding of journey engagement. As can be appreciated, other journey data may additionally or alternatively be presented in association with the workflow visualization. The specific journey data presented may be specified via default settings or user selected. As one example, assume journey path values are tracked. In such a case, a user may select to only display a portion of the journey path values, such as numbers or proportions that are below a threshold value (e.g., an average, 50%, etc.).

Journey insights provider 208 is generally configured to provide insights regarding journeys. A journey insight, or insight, refers to any insight associated with a journey, or portion thereof. In embodiments, a journey insight includes an insight related to audience segments corresponding with a journey, or portion thereof (e.g., a journey path). By way of example only, a journey insight might indicate audience segments traversing various journey paths, underperforming audience segments (e.g., low responsiveness or engagement), or the like.

Generating and/or providing journey insights may be initiated in any number of ways. In embodiments, a user (e.g., marketer) may select to view a journey insight(s). By way of example only, a user may select a journey path, or a journey path value associated therewith. For instance, a user may recognize that a proportionally low number of audience members are interacting with message communicated to the audience members in association with a particular journey path (e.g., a particular audience segment is not interacting with a push notification). As such, the user may select the journey path value, or corresponding journey path, to view an insight as to the audience segment(s) traversing that particular journey path.

To generate a journey insight (e.g., identification of audience segments traversing a journey path), obtained and/or monitored journey data and/or audience member data can be analyzed. In particular, to identify journey insights in the form of audience segments associated with a particular journey, journey path, or journey segment, data and/or audience member data collected and/or monitored, for example, via journey monitor 206 can be analyzed to identify which audience segments traverse a particular journey path.

One implementation for identifying audience segments includes using model interpretation to identify or extract patterns or rules (e.g., if-then rules) in audience segments traversing through a particular journey, or portion thereof (e.g., journey path or segment). In particular, model interpretation can identify patterns or rules that generally describe the behavior of a machine learning model(s) used for classification (e.g., journey paths).

As such, the journey insights provider 208 can generate or train a machine learning model, also referred to herein as a segmentation machine learning model or segmentation model. At a high level, such a segmentation machine learning model may be used to which determine audience segments pass through which journey paths. A segmentation machine learning model can classify or predict which journey path (e.g., journey path 1, journey path 2, journey path 3) an audience member is likely to traverse. A segmentation machine learning model may be a decision tree, a random tree, or any other classification model. A classification model generally refers to a machine learning model used to identify to which of a set of classes or categories (e.g., journey path) a new observation belongs.

To train a segmentation machine learning model, the machine learning model may receive, as input, audience member attributes and/or audience member profiles associated with audience members. Audience member attributes generally refer to any attribute or characteristic associated with an audience member or device being used by an audience member. By way of example only, audience member attributes may include demographic attributes, device attributes, audience member preferences, or the like. An audience member profile includes a set of audience member attributes associated with the user. An audience member profile may also include audience member interactions (e.g., captured via a device). Audience member attributes may be stored in association with an audience member profile, for example, via data store 212. In addition to audience member attributes and/or audience member profiles, the segmentation machine learning model can take as input journey path labels that indicate journey paths traversed by the corresponding audience member. In some cases, the label may indicate whether an audience member went through a particular journey path. A journey path label generally indicates a ground truth. As such, the segmentation machine learning model may be trained based on audience member profile/attribute and label pairs. As one example, and with reference to FIG. 3, a segmentation model may be trained using geo-state attributes 302, gender 304, and journey path indicators 306 and/or 308 in association with audience members 300.

Using the input, the machine learning model is trained to output predicted journey paths for audience members. As such, the machine learning model may predict which journey path an audience member is likely to traverse. By way of example, assume a segmentation model uses two profile attributes, geo-state and gender, as input and predicts between two classes, namely journey path 1 and journey path 2. In training the segmentation model, the model learns patterns that distinguish users across journey paths. As such, the segmentation machine learning model can predict or classify which path a user is likely to go through, such as journey path 1 or journey path 2. Accordingly, in cases that an underperforming journey path is analyzed, the machine learning model can predict which users are likely to traverse an underperforming branch.

As described, by performing model interpretation of the trained segmentation model, patterns related to audience segments that describe users in journey paths can be determined or extracted. As can be appreciated, various implementations of model interpretation may be employed in accordance with embodiments described herein. In one implementation, model agnostic globally interpretable explanations (MAGIX) may be used to interpret the trained segmentation model. MAGIX analyzes the output of the model to automatically extract patterns (or rules) that explain model behavior. One example of a pattern or rule extracted is an if-then rule used to globally explain behavior of the segmentation model. By way of example only, and with reference again to FIG. 3, MAGIX can learn a rule(s) related to audience segments traversing a particular journey path, such as a journey path 2 308 associated with audience members that are not responding to an email communication. In this example, MAGIX can recognize a pattern or rule corresponding with such a journey path 308, such as "If Geo-State=California AND Gender=Female."

Although various model interpretations may be used to interpret the trained segmentation model, MAGIX is provided herein as one example. In more detail, generally, MAGIX operates by extracting conditions recognized as important at the instance level and then evolving rules through a genetic algorithm with an appropriate fitness function. Collectively, the rules represent the patterns followed by the segmentation model for decisioning and facilitate understanding the model behavior. In this way, MAGIX learns rules that explain the behavior of a segmentation model. Generally, each rule is independent and is in if-then form (e.g., If $C_1$ AND $C_2$ AND. . . . Then Predict ClassK). Conditions (Ci) of the if-then rule can be related to any aspect or attribute associated with the audience member (e.g., age range, such as 30<age<40). K represents a class in the data set, such as a journey path or journey segment.

To learn conditions important to explain the classification of certain instances, in one embodiment, local interpretable model-agnostic explanations (LIME) can be used. Advantageously, LIME can facilitate learning conditions useful for distinguishing between classes, as opposed to generating conditions that have high frequency in the data set. Rules can be learned using a genetic algorithm that attempts various condition combinations to optimize a fitness function. As such, MAGIX can be generalized as an extension to LIME that explains model behavior globally in the form of independent if-then rules.

With a MAGIX approach for model interpretation, input including a data set D and the segmentation model M trained using that data set D is obtained. As described above, the data set can include audience member attributes and corresponding label. Using the input, model interpretation can output the set of rules for each class (e.g., journey path or segment). Each rule may include a conjunction of conditions, and each condition may include a set of constraints on values.

In more detail, conditions may be generated for each instance. In this regard, the MAGIX algorithm can iterate over each instance in the training data. As described, for each instance, there is a particular class into which the instance has been classified. The marginal contribution of each feature-value (e.g., attribute) used by the model in arriving at this classification can be determined. In this regard, weights of the different features can be used to determine the marginal contribution values. A list of conditions, including a single feature and corresponding value, for each instance can be obtained. Generating such instance level conditions results in a list of conditions that are important at the instance level.

For each class, a set of conditions that were important in classifying instances of that class are identified. To learn rules for a class (e.g., a journey path or journey segment), a genetic algorithm can be used. Generally, a genetic algorithm is run independently for each class to learn class level rules from class level conditions. In embodiments, an exhaustive rule set for each class is generated. As can be appreciated, filtering may be applied to reduce the number of rules. For example, rules that do not add value to a set, redundant rules, or the like may be eliminated from the set of rules for a particular class. Rules may be eliminated based on any number of criteria, such as order of precision.

Further, rules may be sorted or selected such that the most relevant rules are provided. As one example, rules may be sorted based on rule mutual-information (RMI). Rules can further be compared to other rules to determine similarity such that duplicative or similar rules can be eliminated. One method for comparing similarity uses Jaccard similarity (e.g., if Jaccard similarity is greater than 50%, the rules are deemed similar).

As described, MAGIX is only one model interpretation example for determining patterns or rules related to audience segments that describe audience members in each journey path. Further, other segmentation approaches may be used to identify audience segments that describe audience members in various journey paths or segments. For example, another approach for identifying audience segments may include association rule mining. Association rule mining or learning refers to rule-based machine learning used to discover interesting relations between variables in large databases. In particular, strong rules can be identified using a measure(s) of interestingness. In implementation, association rule mining can utilize audience member profiles associated with audience members entering or traversing a particular journey path or segment to identify patterns that frequently occur.

Upon identifying an audience segment(s) associated with a journey path(s), the journey insights provider 208 can provide the identified audience segments. The audience segment(s) identified in association with a journey path can be provided in any number of ways. In some cases, the audience segment(s) may presented via a display screen in a table format, in a graph format, in text, etc. Further, any number of audience segments may be presented. For example, a distribution of each of the identified audience segments may be presented. As another example, the audience segment having the most (or least) audience members may be presented.

In some cases, upon identifying and presenting a journey insight in the form of an audience segment(s) associated with a journey path(s), a user (e.g., marketer) can select or implement an intervention based on the journey insight. In this regard, a marketer may view the journey insight and, based on the insight, modify the journey (e.g., a journey path, a response, a condition, etc.) in an effort to better obtain a goal (e.g., a marketing goal). For example, journey developer 204 may be used to manipulate or modify the journey.

As previously described, an intervention generally refers to an action to take to target or engage an audience segment, or portion thereof, better. For example, an intervention may be applied to target an underperforming audience segment. An intervention may be applied to an event, a condition, and/or a response associated with a journey. By way of example only, an intervention may include modifying a time at which a response is provided, a channel through which a response is provided, an audience segment to which an intervention is directed (e.g., create a new journey path or segment for a subgroup of an audience segment), content associated with a response, or the like.

Additionally or alternatively to a user initiating an intervention based on analysis of a journey insight, journey suggestion provider 210 may operate to provide an intervention suggestion(s). In some cases, the intervention suggestion can be presented to a user, for example, for selection or confirmation to implement the suggested intervention. In other cases, an intervention suggestion may be automatically implemented. In some implementations in which an automated implementation of an intervention suggestion occurs, the intervention may be presented to the user such that the user views the automatic implementation.

To generate intervention suggestions, the journey suggestion provider 210 generally analyzes interventions in association with audience segments. In this regard, the journey suggestion provider 210 can determine likelihoods of audience segment members' engagement with various interventions. For example, a journey suggestion provider 210 can determine that members of an audience segment are more likely to engage with a first response delivered via a first intervention than with a second response delivered via a second intervention and, thereafter, provide a suggestion of the first intervention to increase audience member engagement.

Determining intervention suggestions for audience segments associated with journey paths can be performed in any number of ways. In one implementation to determine intervention suggestions, the journey suggestion provider 210 can generate and utilize an audience member model. As used herein, an audience member model is generally configured to predict a propensity of an audience member to engage (e.g., respond, interact with, etc.) based on an intervention given the audience member's attributes and the audience member's interaction or engagement history.

An audience member model can be generated in any of a number of ways. In implementations described herein, the audience member model may include a general engagement model (GEM) and/or a campaign specific model (CSM). The general engagement model (GEM) is a model that is trained on an audience member's historical data, including interactions or engagement the audience member had across multiple campaigns (e.g., historical campaigns) associated with journeys. In embodiments, the GEM is a network that maps a state of an audience member and proposed intervention attributes (e.g., channel, content, time, audience segment) to a probability that the audience member responds to the proposed intervention. The audience member state (e.g., Markovian) can be defined based on the audience member attributes and a statistical summary of past interactions (e.g., all past interactions) the audience member has experienced. A statistical summary of past interactions may include, for example, recency (e.g. aggregate information about how recent a previous interaction(s) was), frequency (e.g., aggregate information about how frequently the user interacts with the brand), monetary (e.g., aggregate information an amount (average amount) spent on each interaction), etc. Such an audience member state might be manually generated or generated using a history compression methodology, such as use of an autoencoder or a recurrent autoencoder. Advantageously, the general engagement model is generated using data across any number of journeys such that the GEM reflects how audience members behave across journeys.

The campaign specific model (CSM) generally refers to a variable length sequence classifier. Such a classifier can be implemented as a recurrent neural network (RNN) or using some other architecture (e.g., a transformer). The CSM can be trained using audience member attributes, a sequence of interactions (e.g., a sequence of marketer's intervention attributes and audience member's response, if any), and attributes of a proposed intervention. Generally, the CSM is specific to the campaign and, as such, is trained using data from a current campaign (a particular journey). In some cases, a state construction function, as similar to the GEM, may be implemented in association with the CSM, particularly if the data available from the campaign is insufficient to train a RNN. In such cases, the RNN can be replaced with a feed-forward network with the Markovian state constructed similar to the GEM. In some implementations, a CSM may be trained more frequently, but only in association with a particular journey.

As can be appreciated, in some cases, the audience member model may initially take the form of the GEM (e.g., at a start of a campaign). As sufficient data is collected (e.g., as the campaign progresses), the audience member model can take the form of the CSM. To this end, the collected data in association with the campaign can be used to learn the CSM and, thereafter, the CSM can be used as the audience member model. Advantageously, the GEM can be utilized to facilitate identification of interventions when the journey may not otherwise be associated with sufficient data (e.g., early in campaign).

The trained audience member model (e.g., GEM or CSM) can be used to identify journey suggestions. In this regard, the trained audience member model can obtain input (e.g., audience member attributes, intervention attributes, etc.) and output a probability (e.g., a value between 0 and 1) an audience member will respond to a particular intervention. The audience member model can be executed for various interventions to obtain corresponding probabilities, also referred to as engagement probabilities. Such probabilities output by an audience member model can be used to identify or determine an intervention or set of interventions to suggest for advancing engagement with a journey path, or portion thereof (e.g., a response).

As such, the journey suggestion provider 210 can evaluate the probability(s) of an audience member(s) responding to any proposed intervention(s) to identify intervention suggestions. In embodiments, given an audience segment, an engagement probability can be determined for each audience member in the segment and also the expected probability of engagement for the audience segment as a whole for any given intervention. The interventions can be ranked or sorted in accordance with determined engagement probabilities. For example, interventions can be ranked in descending order of probability of engagement of the audience segment. A set of top k interventions (e.g., with a greatest probability) can be suggested via the journey suggestion provider 210. A set of top k interventions may be determined in any number of ways, such as, for example, based on maximizing the average engagement probability of a given segment of audience members. In some cases, an intervention with a highest or greatest probability across audience members (e.g., a majority of audience members) may be provided as a suggestion. In other cases, interventions exceeding a threshold probability, or a predetermined number (e.g., 3) of the highest ranked interventions may be provided as suggestions.

By way of example only, assume an audience segment identified as underperforming in connection with a response in a journey includes audience members within an age range of 15-25 years. Such an audience segment can be used in association with various interventions to identify corresponding probabilities that audience members respond to the various proposed interventions. In this regard, upon generating and/or selecting an audience member model, various proposed interventions can be analyzed in light of each audience member within the age range of 15-25 years. For example, a probability of engagement of an audience member between 15-25 years with an email sent at 4:00 PM can be compared to engagement with an SMS sent at 10:00 PM. An intervention (e.g., channel, time, and content combination) resulting in a highest probability score across a majority of audience members between the ages of 15 and 25 years can be presented as an intervention suggestion. As described, a user may manually input the intervention by updating or modifying the journey. In other cases, the intervention may be applied automatically or based on a user selection to implement the intervention.

Figure 4:
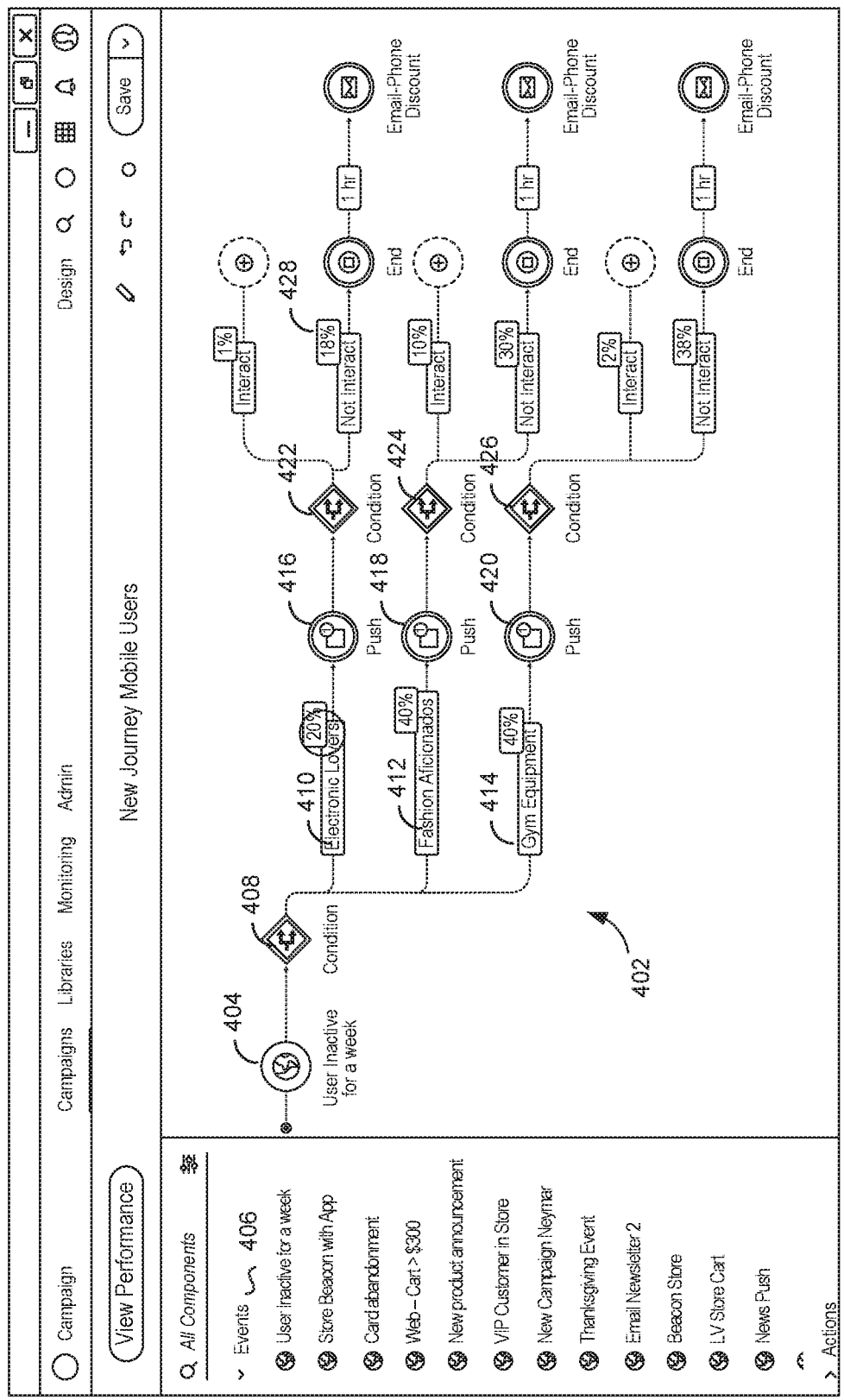
FIGS. 4-6 provide example user interfaces associated with journeys, in accordance with embodiments of the present invention.
Figure 5:
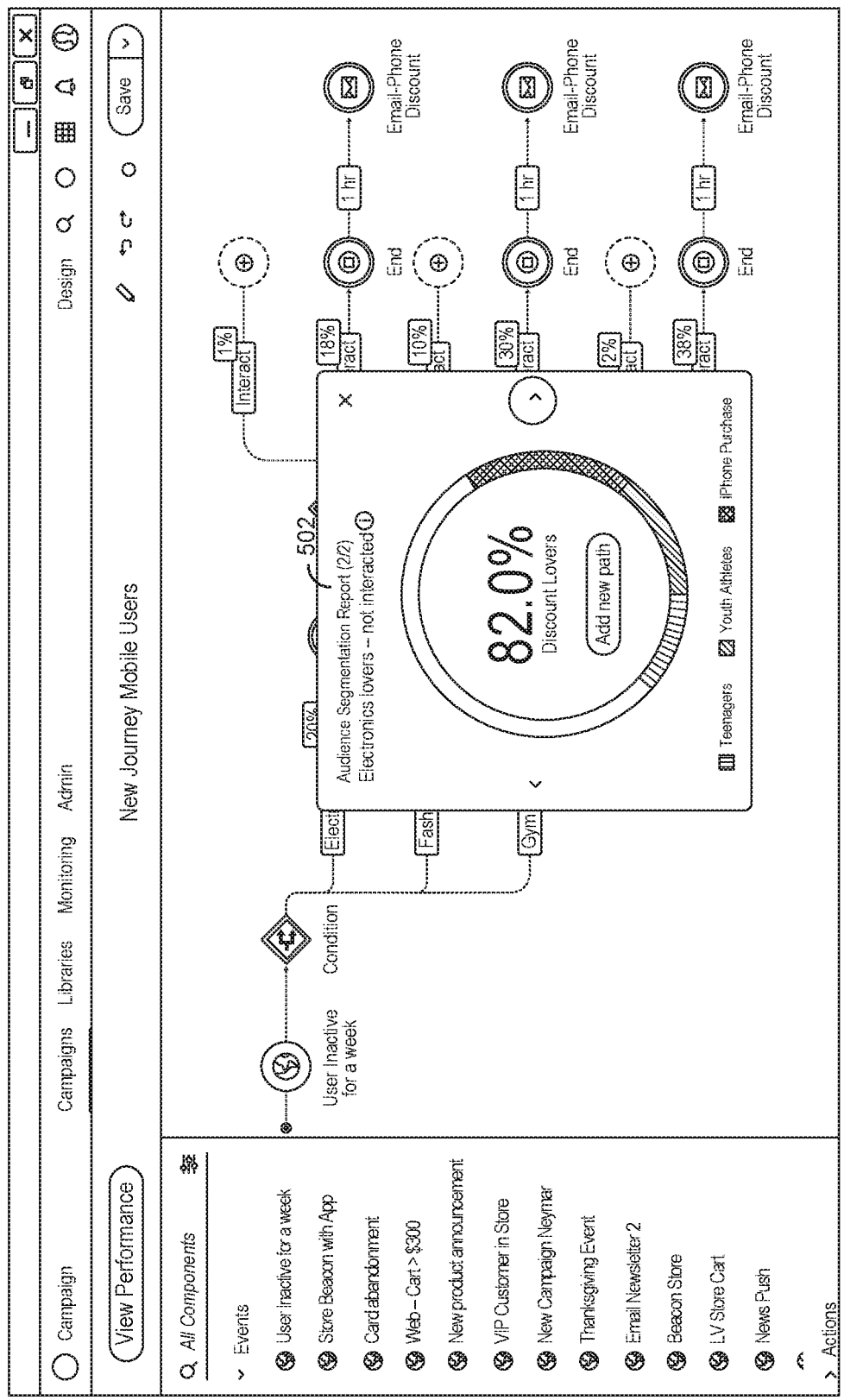
Figure 6:
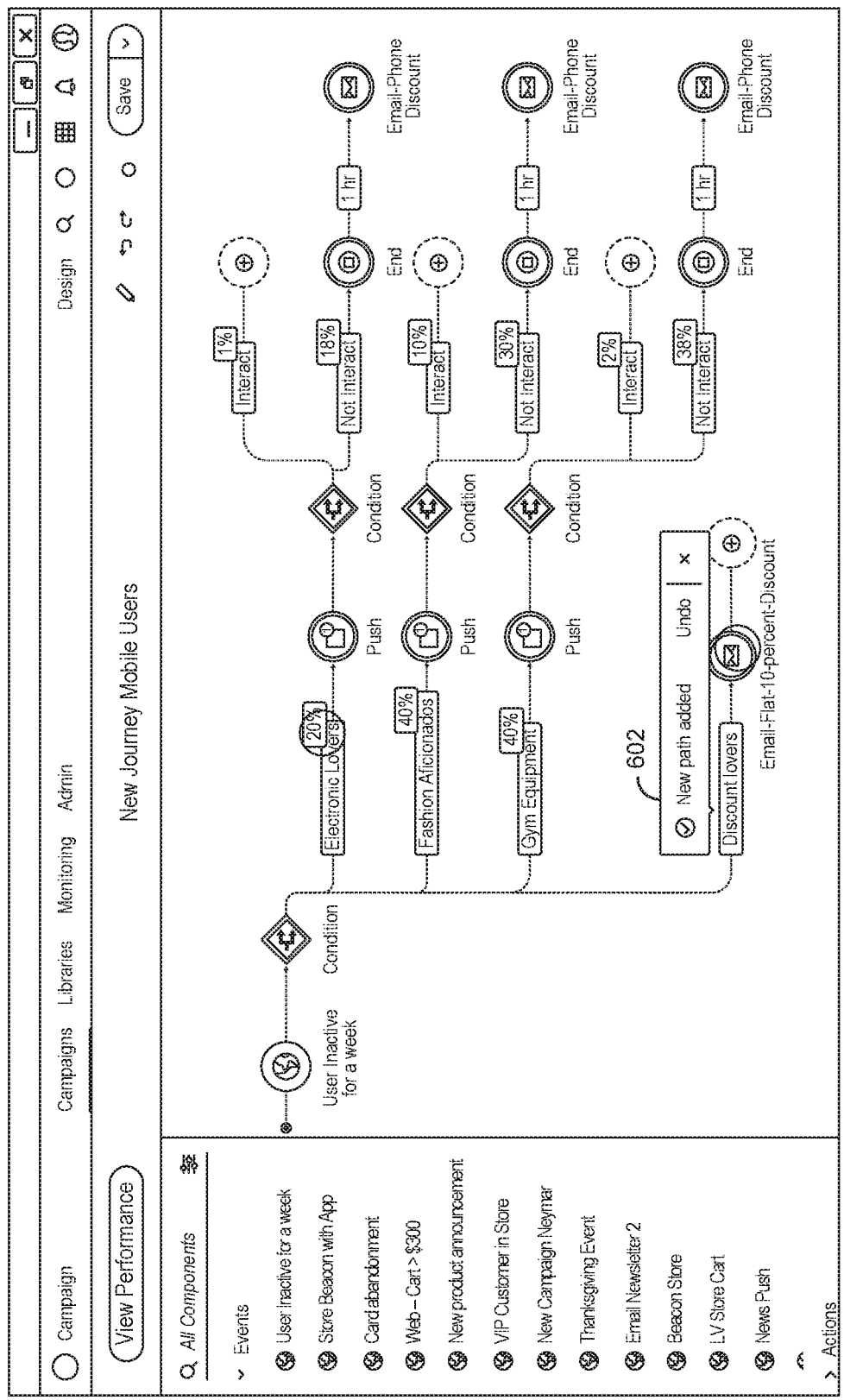

Turning now to FIGS. 4-6, FIGS. 4-6 provide illustrative graphical user interfaces illustrating various aspects of embodiments described herein. Such graphical user interfaces may be presented via a user device, such as user device 102 of FIG. 1. Initially, with respect to FIG. 4, FIG. 4 illustrates an exemplary journey workflow 402. As shown, the journey includes an initial event 404. In this case, the initial event relates to consumers being inactive for a week. The events can be placed in the workflow by dragging and dropping an event from an event panel 406. The user (e.g., marketer) can also add conditions to the journey. In this case, the user added condition 408 which includes different journey paths for different types of audience members. For example, the condition 408 separates electronic lovers to journey path 410, fashion aficionados to journey path 412, and gym equipment to journey path 414. A corresponding response is included for each of the journey paths. For example, response 416 is provided for audience members that are identified as electronic lovers, response 418 is provided for audience members that are identified as fashion aficionados, and response 420 is provided for audience members that are identified as associated with gym equipment. In this case, each response is provided via a "push" but any channel of communication may be used. Each of these journey paths 410, 412, and 414, includes a condition, namely condition 422, 424, and 426. As illustrated, in this case, each condition generates new journey paths based on interaction or no interaction with the corresponding response. Further, in cases in which an audience member does not interact with the pushed response (e.g., within one hour), the journey flows include a targeted email being sent to the audience member. Such a targeted email can include content related to an attribute of the audience member (e.g., related to electronic lovers, fashion aficionados, and gym equipment).

As illustrated in FIG. 4, and in accordance with embodiments described herein, journey performance can be monitored and presented (e.g., in real time). For example, as shown in connection with condition 408, of audience members that were inactive for a week, 20% were electronic lovers, 40% were fashion aficionados, and 40% have an interest in gym equipment. Further, with respect to condition 422, 1% of audience members interacted with the push content 416, while 18% of audience members did not interact with the push content 416. With respect to condition 424, 10% of audience members interacted with the push content 418, while 30% of audience members did not interact with the push content 418. For condition 426, 2% of audience members interacted with push content 420, while 38% did not interact with push content 420.

Although the numbers related to content interaction are shown relative to the entire set of audience members traversing through the journey, alternative embodiments may be employed. For example, content interaction may be provided in percentages relative to the electronic lovers, fashion aficionados, and gym lovers. As another example, numbers or quantity may be presented rather than percentages. Further, various types of journey performance data may be presented via the graphical user interface, and this example is not intended to be limiting.

Assume a user views the journey performance data and would like to view insights related to the 18% of audience members that did not interact with the push content related to electronic lovers. As such, the user may select the journey path value 428. Turning to FIG. 5, in accordance with selecting journey path value 428, the user may be provided with corresponding journey insights 502. The journey insights 502 includes identification of audience segments that did not interact with the push content. In particular, journey insights 502 provides identified sub-segments of the audience segment (electronic lovers). Here, 82% of the audience members were identified as "discount lovers." The journey insights 502 also provides indications of various audience segments associated with the selected journey path. In particular, audience segments of teenagers, youth athletics, and iPhone Purchase are identified.

In addition to viewing the journey insights, an intervention suggestion(s) may be provided. As shown in FIG. 5, an "add new path" intervention suggestion 504 is presented to enable a user to modify the journey to target audience members more effectively. Assume a user selects the interventions suggestion 504. In such a case, the new path 602 related to "discount lovers" can be added to the journey, as illustrated in FIG. 6. As such, a user may target discount lovers with a flat 10% discount that is provided via email. Although this example provides a new audience segment, or journey path, as an intervention suggestion for enhancing the journey, other interventions may be identified via methods described herein. For example, content to communicate, a channel for communicating, a time to communicate, and/or the like, may be identified and provided as an intervention suggestion for improving the propensity for interacting with different marketing actions.

Figure 7:
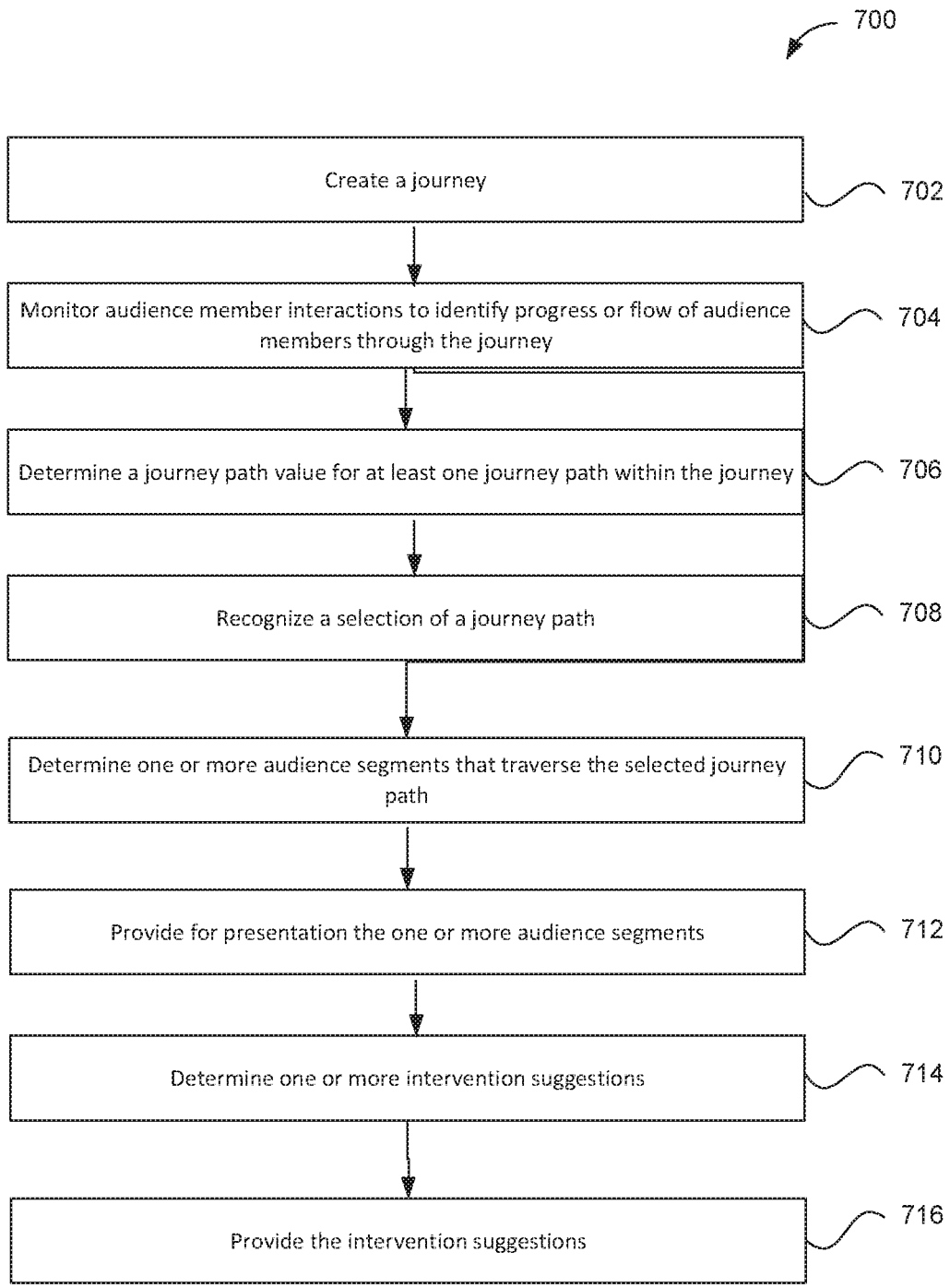
FIG. 7 is a process flow showing a method for facilitating journey management, in accordance with embodiments of the present invention.
Figure 8:
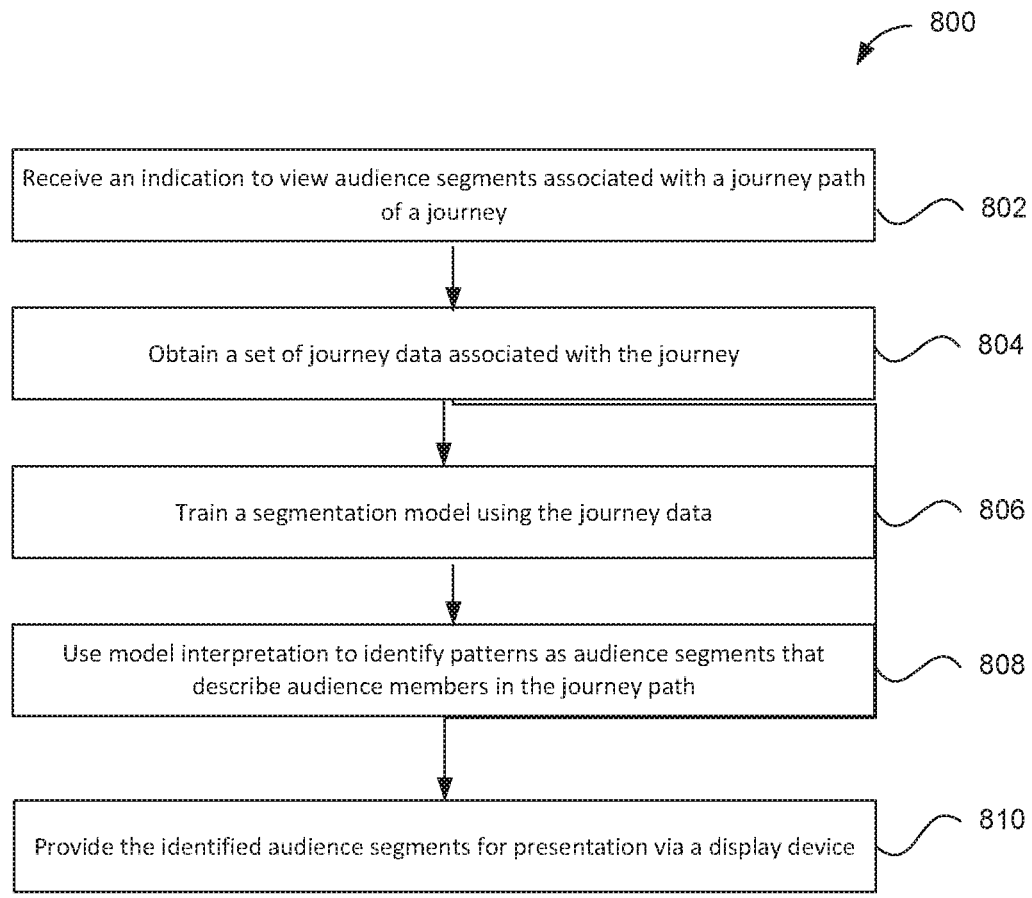
FIG. 8 is a process flow showing a method for providing audience segments, in accordance with embodiments of the present invention.
Figure 9:
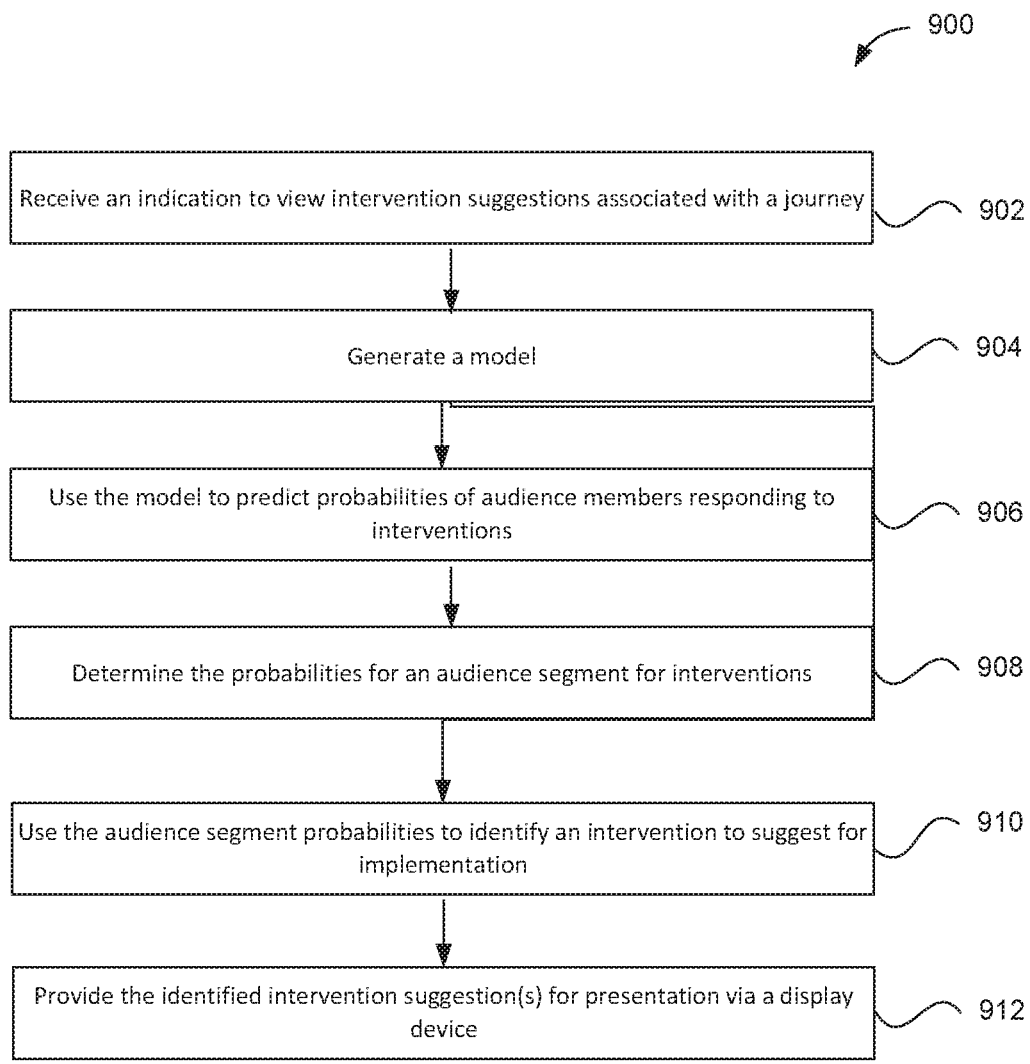
FIG. 9 is a process flow showing a method for providing intervention suggestions, in accordance with embodiments of the present invention.

With reference now to FIGS. 7-9, FIGS. 7-9 provide method flows related to facilitating journey management, in accordance with embodiments of the present technology. Each block of method 700, 800, and 900 comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. The method flows of FIGS. 7-9 are exemplary only and not intended to be limiting. As can be appreciated, in some embodiments, method flows 700-900 may be implemented, at least in part, in real time to enable real time data to be provided to a user.

Turning initially to FIG. 7, a flow diagram 700 is provided showing an embodiment of a method 700 for facilitating journey management, in accordance with embodiments described herein. Initially, at block 702, a journey is created. A journey may be created using various representations of events, controls, and/or responses that are organized or positioned in a workflow via a graphical user interface. At block 704, audience member interactions are monitored to identify progress or flow of audience members through the journey. Audience member interactions may include any interaction or action detectable by a computing device. For example, audience member interactions may include interactions with a website, an application, or the like. An interaction data may also be used to determine a duration of time without an interaction.

At block 706, a journey path value is determined for at least one journey path within the journey. Journey path values may include numbers or percents of audience members that traverse the corresponding journey path. At block 708, a selection of a journey path (e.g., a journey path value) is recognized. At block 710, one or more audience segments that traverse the selected journey path are determined. Audience segments may be determined using model interpretation of a trained machine learning model (e.g., a classification model). The one or more audience segments are provided for presentation, as indicated at block 712. One or more intervention suggestions are determined, as indicated at block 714. For example, intervention suggestions related to modifying a journey may be determined in response to an indication to view intervention suggestions associated with at least one audience segment (e.g., an audience segment identified as less engaged with a provided response). The intervention suggestions are provided at block 716. Such intervention suggestions can be presented to a user via a display of a user device.

Turning to FIG. 8, a process flow is provided related to determining audience segments, in accordance with embodiments described herein. At block 802, an indication to view audience segments associated with a journey path of a journey is received. A user may select to view audience segments for a particular journey path, for example, by selecting the journey path or performance data associated therewith. At block 804, a set of journey data associated with the journey is obtained. The journey data can include audience member attributes and labels indicating journey paths traversed by audience members. At block 806, a segmentation model (e.g., a classification machine learning model) is trained using the journey data. The segmentation model can learn patterns that distinguish audience members across journey paths. Thereafter, at block 808, model interpretation is used to identify patterns as audience segments that describe audience members in the journey path. At block 810, the identified audience segments are provided for presentation via a display device. As can be appreciated, as with other process flows, this process flow may be performed in different orders. For example, in some cases, a segmentation model may be generated and/or interpreted to identify patterns as audience segments before a user selects to view the audience segments associated with a journey path. In such a case, the processing time can be reduced to output the desired results as the model has been previously generated and/or interpreted.

Turning now to FIG. 9, a process flow is provided related to determining intervention suggestions, in accordance with embodiments of the present invention. At block 902, an indication to view intervention suggestions associated with a journey is received. In some cases, a user may specifically select to view intervention suggestions for a journey. In other cases, an indication may be received based on a user specifying to view audience segments, etc. At block 904, a model is generated. In embodiments, the model is trained to predict the propensity of an audience member to respond to an intervention given attributes and interaction history. A model may be a general engagement model or a campaign specific model, as described herein. At block 906, the model is used to predict probabilities of audience members responding to interventions. At block 908, the probabilities for an audience segment as a whole can be determined for interventions. At block 910, the audience segment probabilities can be used to identify an intervention to suggest for implementation. At block 912, the identified intervention suggestion(s) is provided for presentation via a display device. As can be appreciated, as with other process flows, this process flow may be performed in different orders. For example, in some cases, a model may be generated and/or used to determine propensity probabilities before an indication to view intervention suggestions is obtained. In such a case, the processing time can be reduced to output the desired results as the model has been previously generated and/or utilized.

Figure 10:
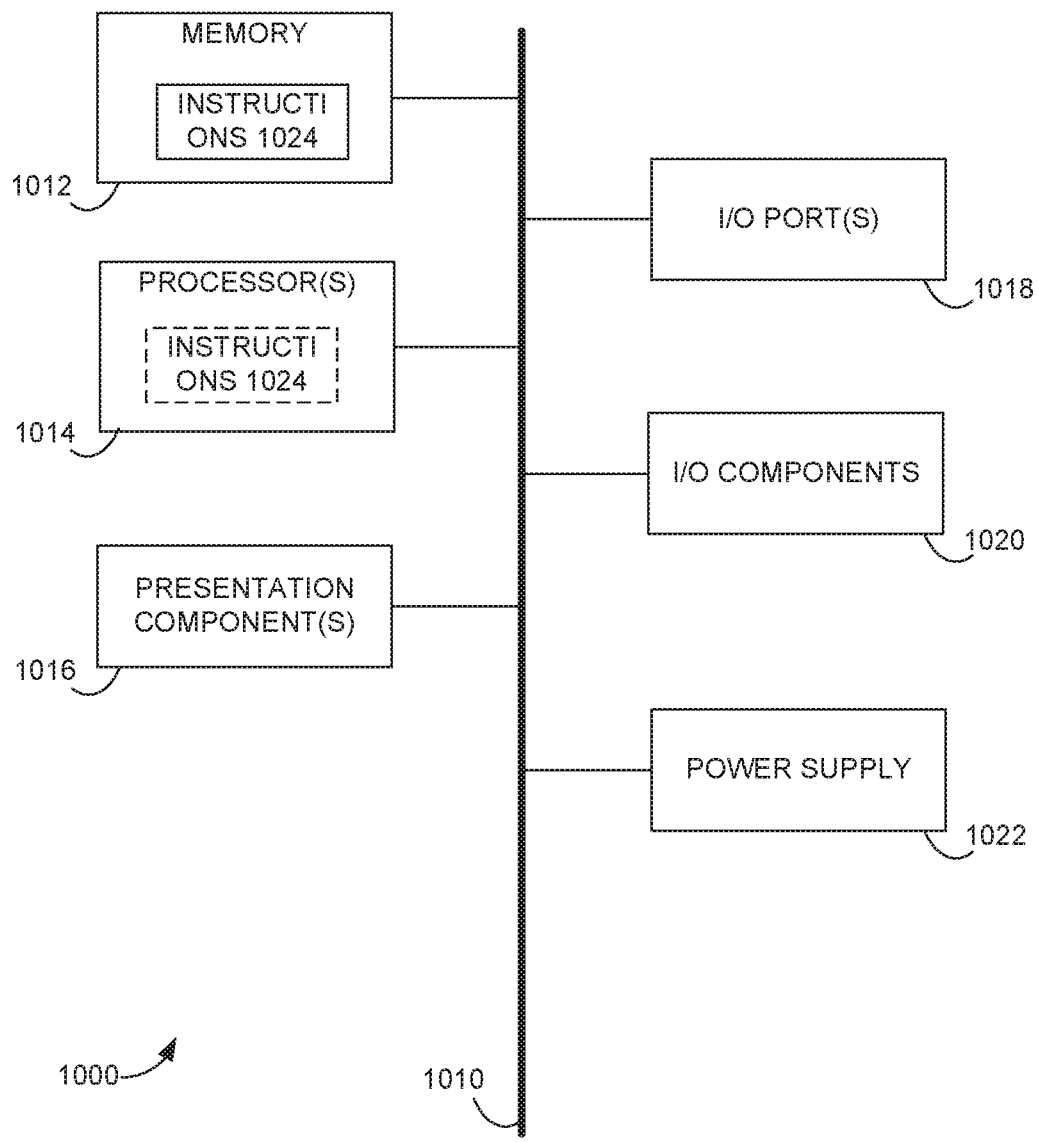
FIG. 10 is a block diagram of an example computing device in which embodiments of the present disclosure may be employed.

Having described embodiments of the present invention, FIG. 10 provides an example of a computing device in which embodiments of the present invention may be employed. Computing device 1000 includes bus 1010 that directly or indirectly couples the following devices: memory 1012, one or more processors 1014, one or more presentation components 1016, input/output (I/O) ports 1018, input/output components 1020, and illustrative power supply 1022. Bus 1010 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 10 is merely illustrative of an exemplary computing device that can be used in connection with one or more embodiments of the present invention. Distinction is not made between such categories as "workstation," "server," "laptop," "handheld device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1000. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 1012 includes computer storage media in the form of volatile and/or nonvolatile memory. As depicted, memory 1012 includes instructions 1024. Instructions 1024, when executed by processor(s) 1014 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc. I/O components 1020 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 1000. Computing device 1000 may be equipped with depth cameras, such as stereoscopic camera systems, infrared camera systems, RGB camera systems, and combinations of these, for gesture detection and recognition. Additionally, computing device 1000 may be equipped with accelerometers or gyroscopes that enable detection of motion. The output of the accelerometers or gyroscopes may be provided to the display of computing device 1000 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented for generating journey insights, the method comprising:
   obtaining, by a journey management system via a network from a set of audience member devices, a set of journey data associated with a journey having one or more journey paths indicating workflows through which audience members traverse, the set of journey data including audience member attributes and labels indicating journey paths traversed by audience members;
   determining, a set of audience segments that describe at least a portion of the audience members traversing a particular journey path;
   training a segmentation model to predict a journey path of the one or more journey paths an audience member will traverse, the segmentation model trained using the audience member attributes and the labels;
   analyzing an output of the segmentation model to identify patterns that indicate an audience segment of the set of audience segments is associated with the particular journey path;
   in response to detecting the audience member traversing the journey, determining, via a recurrent neural network (RNN) while the audience member is traversing the journey and based on the audience segment, a set of probabilities indicating a likelihood of the audience segment interacting with an intervention, where the intervention indicates a modification to the one or more journey paths of the journey to increase engagement of the audience segment of the set of audience segments based on the patterns;
   in response to the audience member traversing at least a portion of the one or more journey paths, applying, via the journey management system, the intervention to the at least the portion of the one or more journey paths automatically while the audience member is traversing the journey; and
   while the audience member is traversing the journey, updating a display device of a user device of the audience segment of the set of audience segments associated with the particular journey path and the intervention.

2. The computer-implemented method of claim 1, wherein the set of journey data comprises real-time journey data.

3. The computer-implemented method of claim 1, wherein the audience member attributes comprise demographic attributes, device attributes, interest attributes, preference attributes, behavior attributes, or a combination thereof.

4. The computer-implemented method of claim 1, wherein the journey path comprises at least one of: a sequence of events, controls, and responses.

5. The computer-implemented method of claim 1 further comprising receiving a selection to view the audience segment associated with the particular journey path.

6. The computer-implemented method of claim 1, wherein the segmentation model comprises a machine learning classification model.

7. The computer-implemented method of claim 1, wherein analyzing the output of the segmentation model comprises performing model interpretation using model agnostic globally interpretable explanations (MAGIX).

8. One or more computer storage media having a plurality of executable instructions embodied thereon, which, when executed by one or more processors, cause the one or more processors to perform a method for providing journey insights, the method comprising:
   obtaining, by a journey management system via a network from a set of audience member devices, a set of journey data associated with a journey having one or more journey paths indicating workflows through which audience members traverse, the set of journey data including audience member attributes and labels indicating journey paths traversed by audience members;
   receiving a selection to view audience segments associated with a journey path of a journey workflow;
   determining a first audience segment that describes a first set of audience members traversing the journey path and a second audience segment that describes a second set of audience members traversing the journey path, the first and second audience segments identified via model interpretation of a classification machine learning model trained based on audience member attributes and labels associated with the journey workflow;

in response to an audience member traversing the journey workflow, determining, via a recurrent neural network (RNN) while the audience member is traversing the journey and based on the audience segment, a propensity of the first audience segment or second audience segment interacting with an intervention including a modification to the journey path to generate a new journey path of the journey workflow to increase audience member engagement for the first audience segment or second audience segment;

in response to the audience member associated with the first audience segment or second audience segment traversing the journey work flowpath, applying the intervention to the journey path such that the audience member is presented the new journey path of the journey workflow; and while the audience member is traversing the journey, providing an indication updating a display device of a user device of the first audience segment, the second audience segment, and the intervention for display.

9. The media of claim 8, further comprising receiving a selection to view the indication.

10. The media of claim 8, wherein the journey workflow comprises a plurality of journey paths indicating workflows though which audience members traverse based on interactions or attributes.

11. The media of claim 8, wherein the intervention is related to content, a channel for distributing content, a time for distributing content, or an audience member segment.

12. The media of claim 8, wherein the propensity indicates a likelihood that the audience member to respond to the intervention given attributes and previous interactions associated with the audience member.

13. The media of claim 8, wherein the intervention is generated using a model that predicts propensities of audience members of an audience segment to respond to the intervention.

14. The media of claim 8, wherein the model interpretation comprises a model agnostic globally interpretable explanations (MAGIX) interpretation model.

15. A computing system comprising:

means for obtaining, by a journey management system via a network from a set of audience member devices, a set of journey data associated with a journey having one or more journey paths indicating workflows through which audience members traverse, the set of journey data including audience member attributes and labels indicating journey paths traversed by audience members;

means for determining a set of audience segments that describe a set of audience members traversing a particular journey path within a journey workflow, the set of audience segments are determined using a segmentation model trained based on a set of journey data including audience member attributes and labels and analyzing the segmentation model to identify patterns that indicate audience segments of the set of audience segments associated with the particular journey path;

means for analyzing an output of the segmentation model to identify patterns that indicate an audience segment of the set of audience segments is associated with the particular journey path;

in response to detecting the audience member traversing the journey, determining, via a recurrent neural network (RNN) while the audience member is traversing the journey and based on the audience segment, a set of probabilities indicating a likelihood of the audience segment interacting with an intervention, where the intervention indicates a modification to the one or more journey paths of the journey to increase engagement of the audience segment of the set of audience segments based on the patterns;

means for determining an intervention comprising a modification that is applied to a journey path within the journey workflow to increase audience member engagement while an audience member is traversing the particular journey path based on a set of propensities indicating likelihoods of the audience segments interacting with the intervention; and in response to the audience member traversing at least a portion of the one or more journey paths, means for applying, via the journey management system the intervention to the journey workflow to cause the audience member to traverse the journey path within the journey workflow while the audience member is traversing the particular journey;

while the audience member is traversing the journey, providing an indication updating a display device of a user device of the audience segment of the set of audience segments associated with the particular journey path and the intervention.

16. The system of claim 15, wherein determining the intervention comprises using a model that predicts the set of propensities of audience members of an audience segment to respond to the intervention based on a pattern indicating the audience segment.

17. The system of claim 15, wherein the intervention is related to content, a channel for distributing content, a time for distributing content, or an audience member segment.

18. The system of claim 15, wherein the segmentation model comprises a classification model and model interpretation comprises a model agnostic globally interpretable explanations (MAGIX) model interpretation.

19. The media of claim 8, wherein the model interpretation comprises determining a set of local interpretable model-agnostic explanations.

20. The system of claim 15, wherein the patterns include local interpretable model-agnostic explanations.

* * * * *